(12) United States Patent
Bowen et al.

(10) Patent No.: US 10,626,799 B2
(45) Date of Patent: Apr. 21, 2020

(54) FLEXIBLE ACOUSTIC HONEYCOMB

(71) Applicant: Hexcel Corporation, Dublin, CA (US)

(72) Inventors: Lisa D. Bowen, Arizona City, AZ (US); Jessica Miller, Casa Grande, AZ (US)

(73) Assignee: HEXCEL CORPORATION, Dublin, CA (US)

(*) Notice: Subject to any disclaimer, the term of this patent is extended or adjusted under 35 U.S.C. 154(b) by 411 days.

(21) Appl. No.: 15/653,686

(22) Filed: Jul. 19, 2017

(65) Prior Publication Data
US 2019/0024589 A1    Jan. 24, 2019

(51) Int. Cl.
| | |
|---|---|
| F02C 7/24 | (2006.01) |
| E04C 2/36 | (2006.01) |
| E04B 1/84 | (2006.01) |
| E04B 1/86 | (2006.01) |
| F02C 7/045 | (2006.01) |
| G10K 11/172 | (2006.01) |
| B32B 3/12 | (2006.01) |
| E04B 1/74 | (2006.01) |
| E04B 1/82 | (2006.01) |

(52) U.S. Cl.
CPC .............. *F02C 7/24* (2013.01); *E04B 1/8409* (2013.01); *E04B 1/86* (2013.01); *E04C 2/365* (2013.01); *F02C 7/045* (2013.01); *G10K 11/172* (2013.01); *B32B 3/12* (2013.01); *E04B 2001/748* (2013.01); *E04B 2001/8245* (2013.01); *E04B 2001/8471* (2013.01); *E04B 2001/8476* (2013.01); *F05D 2250/283* (2013.01); *F05D 2260/96* (2013.01); *Y10T 428/236* (2015.01); *Y10T 428/24149* (2015.01)

(58) Field of Classification Search
CPC .......... F02C 7/24; F02C 7/045; E04B 1/8409; E04B 1/86; E04B 2001/748; E04B 2001/8245; E04B 2001/8271; E04B 2001/8276; E04C 2/365; G10K 11/172; Y10T 428/236; Y10T 428/24149; B32B 3/12; F05D 2250/283; F05D 2260/96
USPC ....................................................... 181/292
See application file for complete search history.

(56) References Cited

U.S. PATENT DOCUMENTS

| | | | |
|---|---|---|---|
| 7,434,659 B2 | 10/2008 | Ayle | |
| 7,510,052 B2 * | 3/2009 | Ayle ........................ | F02C 7/045 181/213 |
| 7,854,298 B2 | 12/2010 | Ayle | |

(Continued)

OTHER PUBLICATIONS

HexWebSelectorGuide2016, 2016.

*Primary Examiner* — Forrest M Phillips
(74) *Attorney, Agent, or Firm* — W. Mark Bielawski; David J. Oldenkamp (57) ABSTRACT

Acoustic structures in which acoustic septa are located in the cells of a honeycomb for reducing the noise generated from a source. The honeycomb used to form the acoustic structure has walls that contain convex and concave contours which make the honeycomb flexible. The acoustic septa are formed by inserting planar acoustic inserts into the honeycomb cells to form a septum cap which is friction-locked within the cell and then permanently bonded in place. The planar acoustic septum is configured to match the unique shape of the cell contours to provide desired friction-locking when inserted into the cells and desired acoustic properties after being permanently bonded in place.

22 Claims, 3 Drawing Sheets

(56) References Cited

U.S. PATENT DOCUMENTS

| | | | | |
|---|---|---|---|---|
| 8,047,329 B1 * | 11/2011 | Douglas | ............... | G10K 11/172 181/292 |
| 8,800,714 B2 * | 8/2014 | Ichihashi | ............. | G10K 11/172 181/292 |
| 9,016,430 B2 | 4/2015 | Ichihashi | | |
| 2013/0299274 A1 * | 11/2013 | Ayle | .................... | G10K 11/172 181/292 |
| 2013/0341119 A1 * | 12/2013 | Ichihashi | ............. | G10K 11/172 181/207 |
| 2015/0041247 A1 * | 2/2015 | Ichihashi | .................. | B32B 3/10 181/292 |
| 2015/0041248 A1 * | 2/2015 | Ichihashi | .................. | E04B 1/84 181/292 |

* cited by examiner

FLEXIBLE ACOUSTIC HONEYCOMB

BACKGROUND OF THE INVENTION

1. Field of the Invention

The present invention relates generally to acoustic structures that are used to attenuate noise that emanates from a specific source. More particularly, the present invention is directed to providing flexible acoustic honeycomb that may be contoured to form acoustic structures having tight radii of curvatures and/or compound curvatures.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed with a solid sound impermeable sheet or skin at the end located away from the engine and covered with a porous or perforated sound permeable covering at the end located closest to the engine. The closing of the honeycomb cells with acoustic material in this manner creates an acoustic resonator that provides attenuation, damping and/or suppression of the noise. Acoustic septums are also usually incorporated into the interior of the honeycomb cells in order to provide the resonator with additional noise attenuation properties.

One way of incorporating acoustic septums into the honeycomb cells is to first form planar acoustic inserts from an acoustic material, such as an acoustic mesh or perforated acoustic film. The planar acoustic inserts are made larger than the cell openings. Accordingly, when the inserts are pushed into the cells with a plunger, they axe folded into an acoustic septum in the form of a cap. The cap shape provides an anchoring portion that contacts the cell walls and a central septum portion which attenuates the sound waves in the cell. Once inserted into the cells, the friction between the anchoring portion of the acoustic septum cap and the honeycomb walls temporarily locks the acoustic septum cap in place. An adhesive is then applied to permanently bond the anchoring portions of the inserted acoustic septum caps to the cell walls.

The permanent bonding of the acoustic septum caps is typically accomplished by dipping the entire honeycomb into a pool of liquid adhesive. The depth to which the honeycomb is dipped into the adhesive is chosen so that the anchoring portions of the inserted acoustic septum caps are immersed in the liquid adhesive. This adhesive dip process is particularly effective because it provides simultaneous bonding of the many hundreds of acoustic septums that are located within a typical acoustic honeycomb.

The insertion of septum caps into honeycomb to form an acoustic honeycomb is described in U.S. Pat. Nos. 7,434,659; 7,510,052, 7,854,298 and 9,016,430. As set forth in these issued patents, friction-locking of the septum caps is an important aspect of the septum-insertion procedure. For example, the septums may shift or otherwise move during handling if friction-locking is not adequate. Any shifting of the septums makes it difficult to apply adhesive uniformly to the septums during bonding. Shifting of the septums also causes uncontrolled altering of the acoustic properties. In the worst case, the septum may fall completely out of the honeycomb cell if friction locking is not adequate.

The majority of honeycomb used in acoustic treatments have hexagonal cells. Such hexagonal honeycomb tends to be stiff and can be difficult to form into curved structures without buckling the cell walls. In most cases, curved acoustic structures are made by seaming together multiple sections of hexagonal acoustic honeycomb. Flexible honeycomb is available which can be formed into structures with tight radii of curvature and compound curves. Flex-Core® honeycomb is a type of flexible honeycomb that is available from Hexcel Corporation (Dublin, Calif.). Flex-Core® honeycomb has a unique cell configuration in which the cell walls include convex and concave curvatures. The unique combination of convex and concave cell wall curvatures, as well as other cell design features of Flex-Core® honeycomb, impart flexibility and formability to the honeycomb so that structures with tight radii and/or compound curvatures can be formed with reduced anticlastic curvature and without buckling the cell walls.

The inherent flexibility of Flex-Core® honeycomb makes it a desirable honeycomb for use in making acoustic structures where tight radii of curvature and/or compound curvatures are required. However, the unique cell configuration of Flex-Core® honeycomb presents complex challenges with respect to the insertion of a septum cap style acoustic septum into the cell.

SUMMARY OF THE INVENTION

In accordance with the present invention, it was discovered that a particular planar acoustic septum insert configuration is well-suited for insertion into Flex-Core® honeycomb cells and honeycomb having similarly contoured cells. The planar acoustic septum insert is configured to account for the unique shape of the cell contours to provide the desired amount of friction locking when inserted into the flexible honeycomb cell while still being able to provide desired acoustic properties after being permanently bonded in place even when the flexible honeycomb is formed into a curved acoustic structure.

The flexible honeycomb which is used to make acoustic structures in accordance with the present invention includes a first edge to be located closest to the sound source and a second edge. The flexible honeycomb includes a cell having a left side and a right side. The cell is defined by a lower wall that extends between the first and second edges and an upper wall that also extends between the first and second edges. The lower wall has a lower left end portion, a lower right end portion and a convex portion located therebetween. The upper wall has an upper left end portion, an upper right end portion and a concave portion located between therebetween. The lower left end portion and the upper left end portion are connected to form a left junction along the left side of the cell. The lower right end portion and the upper right end portion are connected to form a right junction along the right side of said cell.

As a feature of the invention, an acoustic septum is located within the cell. The acoustic septum includes a planar acoustic portion extending transverse to the upper and lower walls of the cell. The planar acoustic portion has a top side located nearest to the first edge of the flexible honeycomb, a bottom side located nearest to the second edge, a right boundary, a left boundary, a lower boundary and an upper boundary. The acoustic septum further includes: a right tab portion protruding from the acoustic portion at the right boundary; a left tab portion protruding from the acoustic portion at the left boundary; a lower tab portion protruding from the acoustic portion at the lower boundary; and an upper tab portion protruding from the acoustic portion at the upper boundary.

As a further feature of the invention, the right tab, left tab, lower tab and upper tab are adhesively bonded to the cell walls such that the right tab is bonded to the lower right portion and the upper right portion, the left tab is bonded to the lower left portion and the upper left portion, the lower tab is bonded to the convex portion and the upper tab is bonded to the concave portion. This particular bonding configurations provides a planar acoustic portion that is well-suited for attenuating noise within the cell.

The present invention is directed to the planar acoustic septum inserts that are inserted into the flexible honeycomb cells to form septum caps that are friction-locked within the cells. The invention is also directed to the flexible honeycomb with the septum caps friction-locked therein as well as the acoustic honeycomb in which the septum caps have been permanently bonded to the cell walls either before or after being formed into a curved structure. The invention is directed to the acoustic structures which contain the acoustic honeycomb, including nacelles, acoustic panels and other acoustic treatments that are used in connection with sound damping of jet engines. In addition, the invention covers methods for making the planar acoustic septum inserts, as well as methods for making flexible acoustic honeycomb and the acoustic structures in which the flexible acoustic honeycomb is located.

The above described and many other features and attendant advantages of the present invention will become better understood by reference to the following detailed description when taken in conjunction with the accompanying drawings.

DETAILED DESCRIPTION OF THE INVENTION

Figure 1:
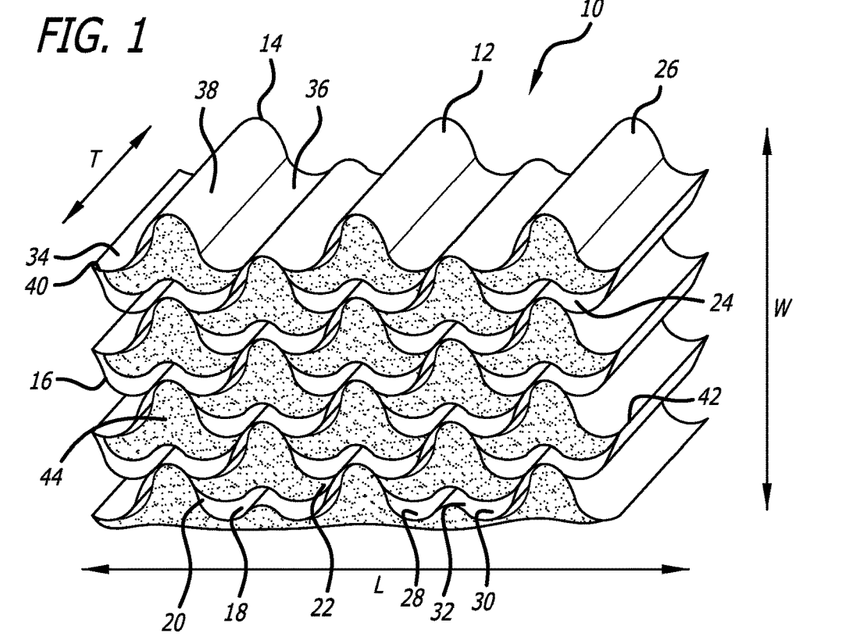
FIG. 1 is a perspective view of an exemplary flexible acoustic honeycomb in accordance with the present invention.

An exemplary flexible acoustic honeycomb for use in an acoustic structure in accordance with the present invention is shown generally at 10 in FIG. 1. The flexible acoustic honeycomb 10 has a lengthwise direction (L), a width direction (W) and a thickness direction (T). The flexible acoustic honeycomb 10 includes a flexible honeycomb 12 having a first edge 14 which is to be located nearest the noise source and a second edge 16. The flexible acoustic honeycomb 10 has cells 18 that each have a left side 20 and a right side 22. Each cell has a lower wall 24 that extends between the first edge 14 and second edge 16 and an upper wall 26 that also extends between the first edge 14 and second edge 16. Each of the cells 18 has a depth which is equal to the honeycomb thickness (T) which is the distance between the two edges 14 and 16. Each cell 18 also has a cross-sectional area that is measured perpendicular to the cell walls 24 and 26.

Figure 4:
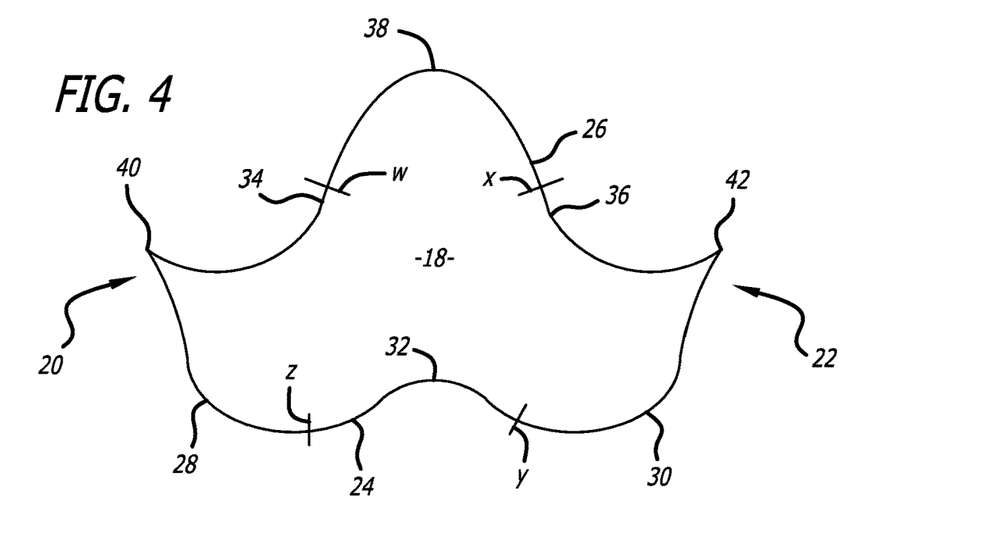
FIG. 4 is a cross-sectional view of a single cell from the flexible honeycomb shown in FIG. 1.

As shown in FIGS. 1 and 4, the lower cell wall 24 has a lower left end portion 28, a lower right end portion 30 and a convex portion 32 which is located between the lower left end portion and lower right end portion. The upper cell wall 26 has an upper left end portion 34, an upper right end portion 36 and a concave portion 38 which is located between the upper left end portion and upper right end portion. The lower left end portion 28 and upper left end portion 34 are connected to form a left junction 40 along the left side of the cell. The lower right end portion 30 and the upper right end portion 36 are connected to form a right junction 42 along the right side of said cell. The approximate location of the transitions between the various portions in the upper and lower cell walls are indicated by hash marks "w", "x", "y" and "z" inn FIG. 4.

Figure 2:
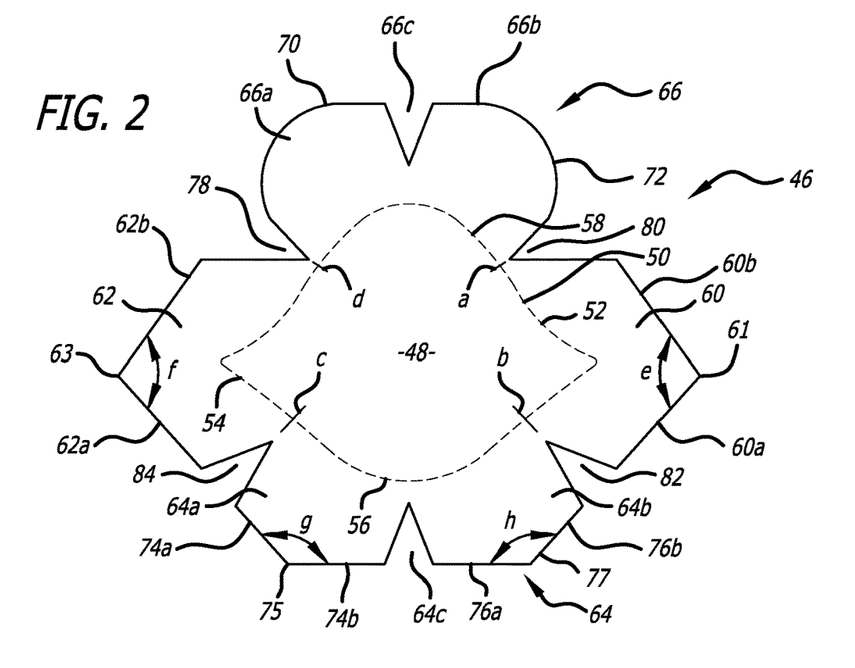
FIG. 2 shows an exemplary planar acoustic septum insert.

The acoustic honeycomb 10 includes septa 44. The septa 44 are formed by inserting numerous planar acoustic septum inserts 46, as shown in FIG. 2, into the honeycomb cells to form acoustic septum caps which are initially friction-locked in place and then adhesively bonded to the cells to form the septa 44. It was discovered that the shape and configuration of the acoustic septum insert must meet certain criteria, as described below, so that the acoustic septum insert folds properly during insertion and forms a septum cap that is adequately friction-locked in the cell and which provides a suitable planar acoustically active central portion after the septum cap has been adhesively bonded to the cell walls.

As shown in FIG. 2, the planar act acoustic septum insert 46 is composed of a centrally located planar acoustic portion 48 which has a perimeter or overall boundary shown, as dotted line 50. The overall boundary 50 is formed by a right boundary 52, a left boundary 54, a lower boundary 56 and an upper boundary 58. The right boundary or right perimeter section 52 extends between boundary markers "a" and "b". The left boundary or left perimeter section 54 extends between boundary markers "c" and "d". The lower boundary or lower perimeter section 56 extends between boundary markers "c" and "b". The upper boundary or upper perimeter section 58 extends between the boundary markers "d" and "a".

The planar acoustic portion 48 is surrounded by tabs which are folded into place against the cell walls during insertion to provide friction-locking of the acoustic septum insert 46 to the cell walls and to later function as anchoring tabs which are permanently bonded to the cell walls. A right tab portion 60 protrudes from the acoustic portion at the right boundary 52. A left tab portion 62 protrudes from the acoustic portion at the left boundary 54. A lower tab portion 64 protrudes from the acoustic portion at the lower boundary 56. An upper tab portion 66 protrudes from the acoustic portion at said upper boundary 58.

The right tab portion 60 includes an outer end which has an angular perimeter with a centrally located apex. Specifically, the angular perimeter is formed by a first outwardly extending edge 60a and a second outwardly extending edge 60b which are oriented at an angle (e) relative to each other such that they meet at apex 61. The left tab portion 62 also includes an outer end which has an angular perimeter with a centrally located apex. The angular perimeter of the outer end of the left tab portion is formed by a first outwardly extending edge 62a and a second outwardly extending edge 62b which are oriented at an angle (f) relative to each other such that they meet at apex 63. The angles "e" and "f" are preferably approximately equal (±5°) and may range from 60 to 120° depending upon the specific configuration of the flexible honeycomb cell. For Flex-Core® honeycomb angles of 90 to 110° are preferred. The angles "e" and "f" are chosen to ensure that tabs 62 and 60 fold so that the apices 63 and 61 fit within the junctions 40 and 42, respectively, at the sides of the cell.

The upper tab portion 66 includes a left upper lobe 66a and a right upper lobe 66b. The lobes 66a and 66b are separated by a V-shaped notch 66c. The outer perimeters 70 and 72 of the lobes are preferably arcuate in shape as shown in FIG. 2. The combination of arcuate perimeters 70 and 72 with, the V-shaped notch 66c provides for particularly effective folding and friction locking of the upper tab portion 66 within the concave portion 38 of the cell wall.

The lower tab portion 64 includes a lower left lobe 64a and a lower right lobe 64b. The lobes 64a and 64b are separated by a V-shaped notch 64c. The lower left lobe 64a includes an outer end which has an angular perimeter with a centrally located apex. The angular perimeter is formed by a first outwardly extending edge 74a and a second outwardly extending edge 74b which are oriented at an angle (g) relative to each other such that they meet at apex 75. The lower right lobe 64b also includes an outer end which also has an angular perimeter with a centrally located apex. The angular perimeter of the lower right lobe is formed by a first outwardly extending edge 76a and a second outwardly extending edge 76b which are oriented at an angle (h) relative to each other such that they meet at apex 77. The angles "g" and "h" are preferably approximately equal (±5°) and may range from 100 to 160° depending upon the specific configuration of the flexible honeycomb cell. For Flex-Core® honeycomb, angles of 120 to 140° are preferred. Lower left and right lobes that have outer ends with angular perimeters and centrally located apices, when combined with the V-shaped notch 64c, provide for effective folding and friction locking of the lower tab portion 64 to the convex portion 32 of the cell wall.

In order to promote desired folding of the planar acoustic insert during insertion into the cell and to provide the necessary friction locking of the insert to the cell walls, it is preferred that tab portions are separated by V-shaped notches as shown at 78, 80, 82 and 84. The V-notches extend inward and terminate relatively close to the boundary 50 of the planar acoustic portion 48. The V-notches should not extend across the boundary 50.

Figure 7:
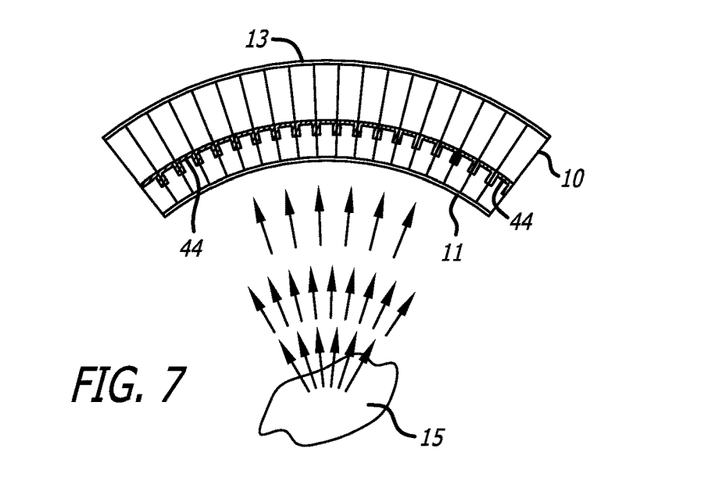
FIG. 7 is a simplified view of an exemplary flexible acoustic structure in accordance with the present invention in place for attenuating sound from a source of noise.

As shown in FIG. 7, the flexible acoustic honeycomb 10 is typically located between a porous or perforated sound permeable face sheet 11 and a solid sound impermeable acoustic barrier face sheet 13 to form an acoustic damping panel or structure which is located near a source of noise 15, such as the interior of a jet engine. The solid acoustic barrier face sheet 13 forms an acoustic barrier at the bottom of the acoustic cells 18 that corresponds to the second edge 16 of the honeycomb 10. Each cell forms an acoustic resonator that has a depth which is equal to the distance between the first edge 14 and second edge 16. Individual acoustic barriers may be inserted into the cells 18 when it is desired that the acoustic bottom of the cells does not correspond to the second edge 16 of the honeycomb 10. The insertion of solid barriers into the cells allows one to form acoustic resonators, when desired, that have depths that are less than the distance between the first edge 14 and second edge 16 of the honeycomb 10.

As also shown in FIG. 7, the tab portions are preferably folded during insertion so that all of the tab portions are on the side of the septum portion which is closest to the noise source. This provides anchoring of the septum to the honeycomb walls on the side of the septum portion that is located nearest to the first edge of the honeycomb and the noise source. However, in some situations, it may be desirable to orient the septum portions within the cell so that the tab portions are located nearest to the second edge and away from the noise source.

The planar acoustic septum 46 is inserted into the honeycomb cell 18 using an insertion tool or plunger. A separate forming die may be used to provide initial folding of the planar acoustic septum prior to insertion into the honeycomb cell. However, a pre-forming die is not usually required or used. Typically, the first edge 14 of the honeycomb functions as the forming die during insertion of the planar acoustic septum. Single planar acoustic septum may be inserted using a single plunger or multiple septa may be simultaneously inserted using multiple plungers.

The cross-sectional shape of the plunger, as well as the cross-sectional size relative to the planar acoustic septum and cell cross-sectional sizes, must be taken into consideration to ensure proper folding and friction-locking. A preferred plunger design is shown at 90 in FIG. 5. The plunger 90 includes a plunger body 92 and a plunger face 94 that contacts the planar acoustic septum. The plunger face 94 preferably has a cross-sectional shape as shown in FIG. 5.

Figure 5:
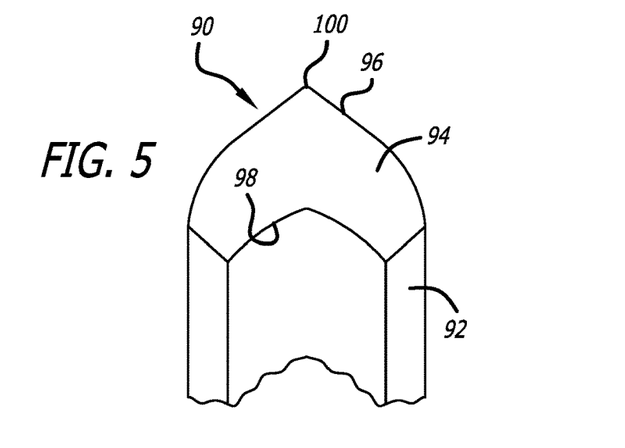
FIG. 5 is a partial perspective view of an exemplary plunger for use in inserting the planar acoustic septum insert into the cell of a flexible honeycomb.

Although other cross-sectional shapes are possible, the cross-sectional shape shown in FIG. 5 was found to provide desired folding of the planar acoustic septum during insertion into the honeycomb to provide a desired planar portion 48 that is securely friction-locked in the cell. The preferred plunger face has a convex portion 96 and a concave portion 98. The convex portion includes a centrally located apex 100. During septum insertion, the apex 100 is located adjacent to the concave portion 38 of the cell and the concave portion 98 of the plunger is located adjacent to the convex portion 32 of the cell. The cross-sectional size of the plunger face 94 is chosen depending upon the thickness of the septum material, the inherent spring back of the septum material and the size and shape of the cell opening.

Figure 6:
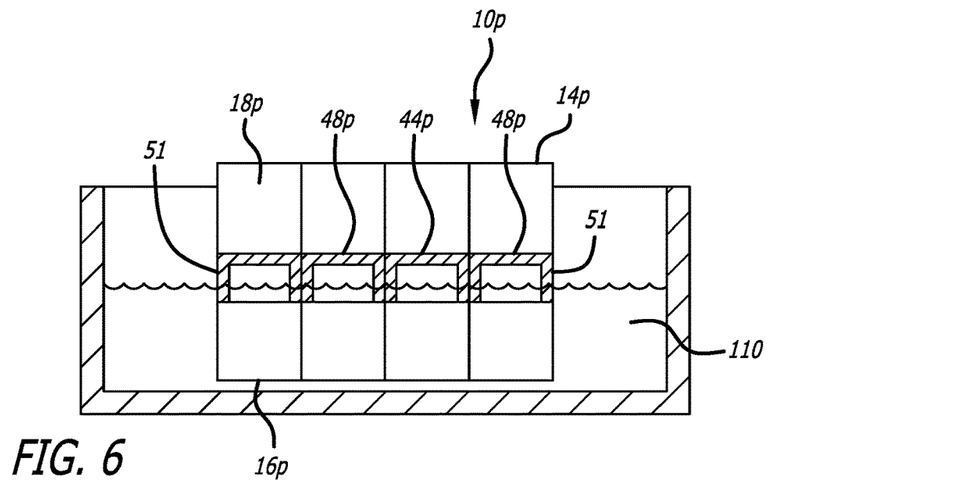
FIG. 6 is a simplified view showing, application of adhesive to septum caps in order to permanently bond the septum caps into the honeycomb cells.

FIG. 6 shows a simplified side-sectional view of septum caps 44P, which have been formed from planar acoustic septum inserts 46, and which have been pressed into place within flexible honeycomb 10P using plunger 90. The identifying numbers in FIG. 6 correspond to the numbers in FIGS. 1 and 2, except that a P is added to indicate that the honeycomb is a precursor structure that still requires permanent bonding of the septum caps 44P in order to a the flexible acoustic honeycomb 10. The septum caps 44P are friction-locked in place by the inherent bounce back of the acoustic insert material. The insertion process places the planar septum portion 48P so that it extends transverse (90°±10°) to the cell walls at the desired insertion depth. The tab portions are shown in their folded positions at 51.

The flexible honeycomb 10P is dipped into a of adhesive 110 so that the tab portions are immersed in the adhesive.

The flexible honeycomb 10P is removed from the adhesive pool 110 and the liquid adhesive is dried or cured to form the flexible acoustic honeycomb 10. This type of adhesive application procedure provides for permanent bonding of the septum caps 44 within the flexible acoustic honeycomb 10. Once formed, the flexible acoustic honeycomb may be used to form a wide variety of curved structures having tight radii of curvature and/or compound curves.

Any of the liquid adhesives typically used to bond septum caps to honeycomb walls may be used to bond the septum caps to the flexible honeycomb walls. Preferred adhesives include those that are stable at high temperature (150-200° C.). Exemplary adhesives include epoxies, acrylics, phenolics, cyanoacrylates, bismaleimides, polyamide-imides, and polyimides. Polyamide-imide adhesives are preferred. The adhesives are chosen to be compatible with both the septum material and the honeycomb material.

The materials used to make the flexible honeycomb 10 can be any of those typically used to make flexible honeycomb, such as metals and composite materials. Exemplary metals include aluminum and aluminum alloys. Exemplary composite materials include fiberglass, resin impregnated aramid paper, such as Nomex®, and various combinations of graphite fibers with suitable matrix resins. Matrix resins that can withstand relatively high temperatures (150 to 200° C.) are preferred.

The materials used to make the solid acoustic barrier face sheets 13 can be any of the solid face sheet materials commonly used for acoustic structures which typically include the same type of materials used to make the honeycomb structure. The materials used to make the perforated sound permeable face sheet 11 can also be any of the materials commonly used for such porous structures provided that the pores or perforations in the structure are sufficient to allow the sound waves from the jet engine or other noise source to enter into the acoustic cells or resonators. The face sheet materials should be sufficiently flexible to allow bonding of the face sheets to the flexible honeycomb once it has been formed into the desired curved structure.

The flexible honeycomb used to make the acoustic honeycomb can be any flexible honeycomb having the type of cells which are shaped to provide the combination of convex and concave curvatures as set forth previously. A preferred flexible honeycomb is Flex-Core® flexible honeycomb which is available from Hexcel Corporation (Dublin, Calif.). The flexible honeycomb shown in FIG. 1 is representative of Flex-Core® flexible honeycomb. Flex-Core® flexible honeycomb is made from a variety of suitable materials including 5052 or 5056 aluminum, aramid/phenolic composite and fiberglass/phenolic composite.

The flexible honeycomb cells used for making flexible acoustic honeycomb will typically have a cross-sectional area ranging from 0.05 square inch to 1 square inch or more. The depth of the acoustic cells (honeycomb or core thickness T) will generally range from 0.25 to 3 inches or more. The wall thicknesses of the honeycomb material will typically range from 0.001 to 0.050 inch. For jet engine nacelles, the flexible honeycomb cells will typically have a cross-sectional area of about 0.1 to 0.5 square inch, wall thicknesses of around 0.025 to 0.05 inch and a depth of about 1.0 and 2.0 inches.

Any of the standard acoustic materials may be used to form the septum caps 44. These acoustic materials are typically provided as relatively thin sheets that are perforated, porous or an open mesh fabric that is designed to provide noise attenuation. Perforations are formed in the solid sheet material either before or after the septa are placed within the flexible honeycomb cells. Although any suitable metal, ceramic or plastic acoustic material may be used to make perforated septa, it is preferred that the acoustic material be polyether ether ketone (PEEK) or a similar chemically resistant polymer material that is suitable for high temperature applications. Sheets or films of PEEK are available commercially from a number of sources, such as Victrex USA (Greenville, S.C.) which produces sheets of PEEK under the tradename VICTREX® PEEK™ polymer.

When using solid films as the septum material, holes are drilled through the film within the overall boundary 50 of the planar acoustic portion 48. The holes may be drilled using a laser or other suitable hole drilling system. The various tab portions that are located outside the overall boundary 50 may remain solid or can also be drilled to varying degrees, if desired, to increase surface area and adhesive bonding of the tab portions to the cell walls.

Although perforated and porous sheets of various materials (metals, ceramics, plastics) may be used, it is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA 12); are just a few examples. Open mesh monofilament fabric made from PEEK is preferred for high temperature applications. Open mesh monofilament acoustic fabrics and other acoustic materials that may be used to form the septum caps in accordance with the present invention are available from a wide variety of commercial sources. For example, sheets of open mesh monofilament acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEK-TEX.

Hybrid septum caps are possible where the planar septum portion is made from an open mesh monofilament fabric with tab portions being made from solid films of plastic. In certain situations, this combination may provide desired acoustic properties and septum strength. For example, a PEEK open mesh fabric planar septum portion combined with tab portions that are PEEK solid film is possible. The PEEK open mesh fabric is heat bonded or welded to the solid film tab portions in accordance with known thermal bonding procedures. The solid film tab portions may be perforated, if desired to aid in adhesive bonding of the tab portions to the cell walls.

Although the acoustic fabric can be made from a combination of different woven fibers, it is preferred that the fibers in the acoustic fabric, be made from the same material. In many acoustic fabrics the warp direction fibers (warp fibers) are generally made from smaller diameter fibers than the weft direction fibers (weft fibers). Accordingly, the weft fibers tend to be stronger and less flexible than the warp direction fibers. Flexibility of the weft fibers may also be increased relative to the warp fibers by altering the chemistry (rather than the diameter) of the weft fiber to provide a stiffer fiber.

In woven fabric where the fibers in one direction are less flexible or stronger than the cross-direction fibers, the stronger fibers are commonly referred to as the dominant fibers. The planar acoustic septum inserts may be made from all types of woven acoustic fabric including those where there is no dominant fiber. However, it is preferred that the woven monofilament acoustic septum material includes dominate fibers and that the dominate fibers are the weft fibers.

Figure 3:
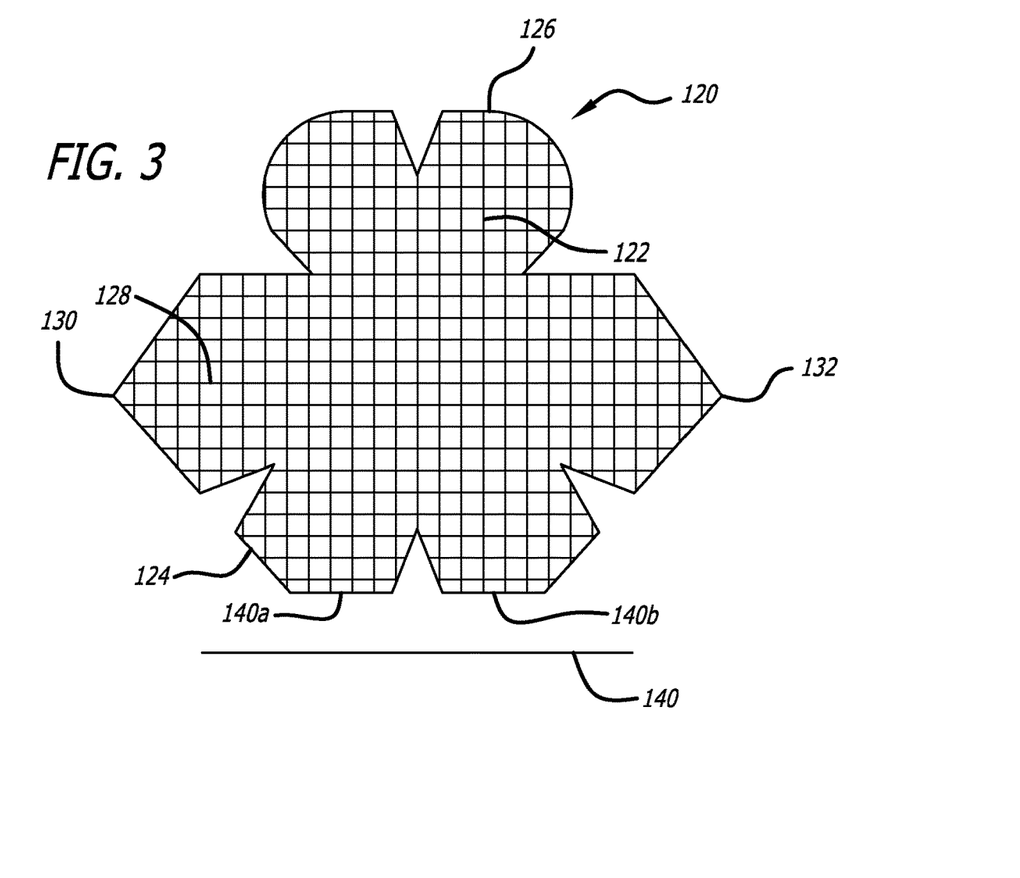
FIG. 3 shows a preferred exemplary planar acoustic septum insert.

A preferred planar acoustic septum insert is shown at 120 in FIG. 3. The planar acoustic septum insert is a woven monofilament open mesh acoustic fabric in which dominate weft fibers 122 are oriented parallel to each other and extend in a direction from the lower tab portion 124 to the upper tab portion 126. The warp fibers 128 are oriented parallel to each other and extend in a direction between the apices 130 and 132 of the outer ends of the left and right tab portions. It was discovered that orienting the weft (dominate) fibers and warp fibers, as shown in FIG. 3, provides for folding and friction-locking of the planar acoustic septum insert to the honeycomb cell walls that is more effective than other dominate fiber orientations.

Preferred weft fiber orientations include those where the weft fiber extend in a direction that is substantially perpendicular to line 140, as shown in FIG. 3. Line 140 is preferably parallel to the outwardly extending edges 140a and 140b of the lower tab portion 124. Line 140 would also be parallel to the outwardly extending edges 74b and 76a of the lower tab portion 64 of the planar acoustic insert shown in FIG. 2. Substantially perpendicular means that the angle between the well fiber direction and line 140 may vary from 80 to 100 degrees. Line 140 is also preferably parallel to a line extending from the apex 130 to apex 132.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure in which acoustic septa are located in the cells of a flexible honeycomb for reducing the noise generated from a source, said acoustic structure comprising:
    A) a flexible honeycomb comprising a first edge to be located closest to said source and a second edge, said flexible honeycomb comprising a plurality of cells wherein each cell has a left side and a right side, said cell being defined by a lower wall that extends between said first and second edges and an upper wall that also extends between said first and second edges, said lower wall comprising a curved lower left end portion, a curved lower right end portion and a central convex portion located between said lower left and lower right end portions, said upper wall comprising a curved upper left end portion, a curved upper right end portion and a central concave portion located between said upper left and upper right end portions, wherein said lower left end portion and said upper left end portion are connected to form a left junction along the left side of said cell and said lower right end portion and said upper right end portion are connected to form a right junction along the right side of said cell;
    B) an acoustic septum comprising:
        a) a planar acoustic portion extending transverse to said upper and lower walls, said planar acoustic portion having a top side located nearest to said first edge, a bottom side located nearest to said second edge, a right boundary, a left boundary, a lower boundary and an upper boundary;
        b) a right tab portion protruding from said acoustic portion at said right boundary;
        c) a left tab portion protruding from said acoustic portion at said left boundary;
        d) a lower tab portion protruding from said acoustic portion at said lower boundary;
        e) an upper tab portion protruding from said acoustic portion at said upper boundary wherein notches separate the upper tab portion from said right tab portion and said left tab portion and wherein notches separate the lower tab portion from said right tab portion and said left tab portion; and
    C) an adhesive that bonds said right tab, left tab, lower tab and upper tab to said honeycomb wherein said right tab is bonded to said lower right portion and said upper right portion, said left tab is bonded to said lower left portion and said upper left portion, said lower tab is bonded to said convex portion and said upper tab is bonded to said concave portion.

2. An acoustic structure according to claim 1 wherein said upper tab portion comprises a left upper lobe and a right upper lobe and said lower tab portion comprises a left lower lobe and a right lower lobe.

3. An acoustic structure according to claim 1 wherein V-shaped notches separate the upper tab portion from said right tab portion and said left tab portion.

4. An acoustic structure according to claim 2 where said left upper lobe is separated from said right upper lobe by a V-shaped notch.

5. An acoustic structure according to claim 2 wherein said left lower lobe is separated from said right lower lobe by a V-shaped notch.

6. An acoustic structure according to claim 2 wherein said left upper lobe and said right upper lobe each have a curved perimeter.

7. An acoustic structure according to claim 2 wherein said left lower lobe and said right lower lobe each have an outer end formed by an angular perimeter with a centrally located apex.

8. An acoustic structure according to claim 1 wherein said right tab portion and said left tab portion each have an outer end formed by an angular perimeter with a centrally located apex.

9. An acoustic structure according to claim 1 wherein said acoustic septum is an acoustic mesh comprising dominate monofilament fibers which extend parallel to each other in a direction from said lower tab portion to said upper tab portion.

10. An acoustic structure according to claim 1 which includes a sound permeable sheet attached to the first edge of said flexible honeycomb and a solid sound impermeable sheet attached to the second edge of said flexible honeycomb.

11. A method for making an acoustic structure in which acoustic septa are located in the cells of a flexible honeycomb for reducing the noise generated from a source, said method comprising the steps of:
    A) providing a flexible honeycomb comprising a first edge to be located closest to said source and a second edge, said flexible honeycomb comprising a plurality of cells wherein each cell has a left side and a right side, said cell being defined by a lower wall that extends between said first and second edges and an upper wall that also extends between said first and second edges, said lower wall comprising a curved lower left end portion, a curved lower right end portion and a central convex portion located between said lower left and lower right end portions, said upper wall comprising a curved upper left end portion, a curved upper right end portion and a central concave portion located between said upper left and upper right end portions, wherein said lower left end portion and said upper left end portion are connected to form a left junction along the left side of said cell and said lower right end portion and said upper right end portion are connected to form a right junction along the right side of said cell;

B) providing a planar acoustic septum insert comprising:
  a) a planar acoustic portion having a right boundary, a left boundary, a lower boundary and an upper boundary;
  b) a right tab portion protruding from said acoustic portion at said right boundary;
  c) a left tab portion protruding from said acoustic portion at said left boundary;
  d) a lower tab portion protruding from said acoustic portion at said lower boundary;
  e) an upper tab portion protruding from said acoustic portion at said upper boundary wherein notches separate the upper tab portion from said right tab portion and said left tab portion and wherein notches separate the lower tab portion from said right tab portion and said left tab portion;

C) inserting said planar acoustic septum insert into said cell to form an acoustic septum wherein said planar acoustic portion extends transverse to said upper and lower walls, said planar acoustic portion having a top side located nearest to said first edge, a bottom side located nearest to said second edge; and D) bonding said right tab, left tab, lower tab and upper tab to said honeycomb wherein said right tab is bonded to said lower right portion and said upper right portion, said left tab is bonded to said lower left portion and said upper left portion, said lower tab is bonded to said convex portion and said upper tab is bonded to said concave portion.

12. A method for making an acoustic structure according to claim 11 wherein said upper tab portion comprises a left upper lobe and a right upper lobe and said lower tab portion comprises a left lower lobe and a right lower lobe.

13. A method for making an acoustic structure according to claim 11 wherein V-shaped notches separate the upper tab portion from said right tab portion and said left tab portion.

14. A method for making an acoustic structure according to claim 12 where said left upper lobe is separated from said right upper lobe by a V-shaped notch.

15. A method for making an acoustic structure according to claim 12 wherein said left lower lobe is separated from said right lower lobe by a V-shaped notch.

16. A method for making an acoustic structure according to claim 12 wherein said left upper lobe and said right upper lobe each have a curved perimeter.

17. A method for making an acoustic structure according to claim 12 wherein said left lower lobe and said right lower lobe each have an angular perimeter with a centrally located apex.

18. A method for making an acoustic structure according to claim 11 wherein said right tab portion and said left tab portion each have an outer end formed by an angular perimeter with a centrally located apex.

19. A method for making an acoustic structure according to claim 11 wherein said acoustic septum is an acoustic mesh comprising dominate plastic monofilament fibers which extend parallel to each other in a direction from said lower tab portion to said upper tab portion.

20. A method for making an acoustic structure according to claim 11 which includes the steps of attaching a sound permeable sheet to the first edge of said honeycomb and attaching a solid sound impermeable sheet to the second edge of said flexible honeycomb.

21. A flexible acoustic honeycomb for use in making an acoustic structure according to claim 1 in which acoustic septa are located in the cells of the flexible honeycomb for reducing the noise generated from a source, said flexible acoustic honeycomb comprising:

A) a flexible honeycomb comprising a first edge to be located closest to said source and a second edge, said honeycomb comprising a plurality of cells wherein each cell has a left side and a right side, said cell being defined by a lower wall that extends between said first and second edges and an upper wall that also extends between said first and second edges, said lower wall comprising a curved lower left end portion, a curved lower right end portion and a central convex portion located between said lower left and lower right end portions, said upper wall comprising a curved upper left end portion, a curved upper right end portion and a central concave portion located between said upper left and upper right end portions, wherein said lower left end portion and said upper left end portion are connected to form a left junction along the left side of said cell and said lower right end portion and said upper right end portion are connected to form a right junction along the right side of said cell;

B) an acoustic septum comprising:
  a) a planar acoustic portion extending transverse to said upper and lower walls, said planar acoustic portion having a top side located nearest to said first edge, a bottom side located nearest to said second edge, a right boundary, a left boundary, a lower boundary and an upper boundary;
  b) a right tab portion protruding from said acoustic portion at said right boundary;
  c) a left tab portion protruding from said acoustic portion at said left boundary;
  d) a lower tab portion protruding from said acoustic portion at said lower boundary; and
  e) an upper tab portion protruding from said acoustic portion at said upper boundary wherein notches separate the upper tab portion from said right tab portion and said left tab portion and wherein notches separate the lower tab portion from said right tab portion and said left tab portion and wherein said acoustic septum is held in place by frictional engagement of said right tab with said lower right portion and said upper right portion, frictional engagement of said left tab with said lower left portion and said upper left portion, frictional engagement of said lower tab with said convex portion and frictional engagement of said upper tab with said concave portion.

22. A planar acoustic septum insert for insertion into a cell of a flexible honeycomb to form a flexible acoustic honeycomb according to claim 20, said planar acoustic septum insert comprising:
  a) an acoustic portion having a right boundary, a left boundary, a lower boundary and an upper boundary;
  b) a right tab portion protruding from said acoustic portion at said right boundary;
  c) a left tab portion protruding from said acoustic portion at said left boundary;

d) a lower tab portion protruding from said acoustic portion at said lower boundary said lower tab comprising a right lower lobe and a left lower lobe; and
e) an upper tab portion protruding from said acoustic portion at said upper boundary, said upper tab portion comprising a right upper lobe and a left upper lobe wherein notches separate the upper tab portion from said right tab portion and said left tab portion and wherein notches separate the lower tab portion from said right tab portion and said left tab portion.

* * * * *